United States Patent
Bin Mohamed Iqbal et al.

(10) Patent No.: US 12,355,868 B2
(45) Date of Patent: Jul. 8, 2025

(54) SYSTEM AND METHOD OF SECURING AI MODEL

(71) Applicant: EFINIX, INC., Cupertino, CA (US)

(72) Inventors: Mohamed Faiz Bin Mohamed Iqbal, Alor Setar (MY); Ching Lun Yan, Bayan Lepas (MY); Yee Hui Lee, Bayan Lepas (MY)

(73) Assignee: EFINIX, INC., Cupertino, CA (US)

( * ) Notice: Subject to any disclaimer, the term of this patent is extended or adjusted under 35 U.S.C. 154(b) by 81 days.

(21) Appl. No.: 18/169,001

(22) Filed: Feb. 14, 2023

(65) Prior Publication Data

US 2024/0275583 A1    Aug. 15, 2024

(51) Int. Cl.

| | |
|---|---|
| *G06F 21/44* | (2013.01) |
| *G06F 15/78* | (2006.01) |
| *G06F 21/45* | (2013.01) |
| *G06F 21/62* | (2013.01) |
| *G06N 5/04* | (2023.01) |
| *H04L 9/06* | (2006.01) |
| *H04L 9/08* | (2006.01) |
| *G06F 21/60* | (2013.01) |

(52) U.S. Cl.
CPC ........ *H04L 9/0844* (2013.01); *G06F 15/7807* (2013.01); *G06F 21/44* (2013.01); *G06F 21/45* (2013.01); *G06F 21/62* (2013.01); *G06N 5/04* (2013.01); *H04L 9/0631* (2013.01); *H04L 9/0822* (2013.01); *G06F 21/602* (2013.01)

(58) Field of Classification Search
CPC ....... H04L 9/0844; H04L 9/08; H04L 9/0631; H04L 9/0822; H04L 9/32; H04L 63/04; H04L 63/0428; H04L 63/0435; H04L 63/12; G06F 21/44; G06F 21/45; G06F 21/57; G06F 21/572; G06F 21/60; G06F 21/602

See application file for complete search history.

(56) References Cited

U.S. PATENT DOCUMENTS

| | | | | |
|---|---|---|---|---|
| 11,574,032 | B2* | 2/2023 | Cheng | G06N 20/00 |
| 2018/0278583 | A1* | 9/2018 | Cela | H04L 63/061 |
| 2019/0363880 | A1* | 11/2019 | Lee | G06F 15/7807 |
| 2020/0320417 | A1* | 10/2020 | Corning | G06F 21/85 |
| 2022/0164481 | A1* | 5/2022 | Lin | G06F 21/64 |

FOREIGN PATENT DOCUMENTS

CN          114428761          5/2022

* cited by examiner

*Primary Examiner* — Shaqueal D Wade-Wright
(74) *Attorney, Agent, or Firm* — HSML P.C

(57) ABSTRACT

A system and method of securing artificial intelligence (AI) model based on field programmable gate array (FPGA) which is aimed at overcoming attacks against AI models by protecting the architecture of the AI model. The system includes a processor and a custom instruction hardware developed on at least one FPGA, wherein the processor and custom instruction hardware are connected via custom instruction interfaces. Through the custom instruction interfaces, the processor performs matching of an authentication key given by a user to ensure that the application is running on trusted devices while the custom instruction hardware decrypts an encrypted AI model if authentication is successful, before sending decrypted AI model to the processor to be executed in any suitable application such as AI inference.

20 Claims, 5 Drawing Sheets

SYSTEM AND METHOD OF SECURING AI MODEL

1. TECHNICAL FIELD OF THE INVENTION

The present invention relates to a system and method of securing artificial intelligence (AI) model based on field programmable gate array (FPGA) which is aimed at overcoming attacks against AI models by protecting the architecture of said AI model. The system comprises of a processor and a custom instruction hardware developed on at least one FPGA, wherein the processor and custom instruction hardware are connected via custom instruction interfaces. Through the custom instruction interfaces, the processor performs matching of an authentication key given by a user to ensure that the application is running on trusted devices while the custom instruction hardware decrypts an encrypted AI model if authentication is successful, before sending decrypted AI model to the processor to be executed in any suitable application such as AI inference.

2. BACKGROUND OF THE INVENTION

Artificial intelligence (AI), especially neural network (NN) is gaining popularity and is widely used in various domains such as vision, audio, and time series applications. Typically, AI training is performed using central processing unit (CPU) or graphics processing unit (GPU), whereas AI inference is being deployed at the edge using mobile GPU, microcontroller (MCU), application-specific integrated circuit (ASIC) chip, or field programmable gate array (FPGA).

While devices with edge AI capabilities are popular especially in the Internet of Things (IoT) domain, security challenges abound as it is exposed to different types of security attacks. Some of the attacks include AI model extraction or theft, whereby the attacker typically analyzes the input data, output data and information of the model to speculate the parameter inside said AI model and replicate the target AI model architecture.

Protecting the AI model architecture is very important as training an AI model is costly; whereby a mass of relevant samples needs to be collected, data needs to be preprocessed to solve specific problems, and fine tuning needs to be performed on said AI model architecture in order to get a finalized AI model architecture.

Typically, the AI model is stored in flash memory. During boot-up, a specific program will load the AI model from the flash memory and perform AI inference. However, the attacker can easily gain access to the AI model on flash memory. One of the security implementations is by using a secured flash memory to store the AI model. However, using a secured flash memory is still insufficient to prevent the attacker hacking into the flash memory to obtain the information of the AI model architecture.

It is important to apply security features on the AI model itself so that even when the attacker obtains the model, they are not able to easily decode the architecture of the model. Security implementation such as model watermarking might cause performance drop as it can affect the overall inference time. Another method to protect the AI model is by encrypting the model itself and applying authentication as well as decryption flow before performing AI inference.

AI inference software stack is generally used by mobile GPU and MCU as it is more flexible compared to custom implementations on ASIC chip or FPGA. Software stack also has an advantage of library sharing, which enables faster time to deliver new layers compared to custom ASIC chip and FPGA. However, once the software stack has been fully optimized and further speed up is needed for the inference, a more powerful mobile GPU or MCU is required which results in higher costs and power consumption. In terms of security, software stack generally is more vulnerable as it exposes user data and crucial application data especially to attackers. This allows the attacker to gain access on the device, as well as able to perform physical access to the AI model and others. In order to increase the security level on GPU and MCU in protecting the AI model and application, a dedicated Authentication semiconductor intellectual property core (IP core) and Decryption IP core is needed which increases the cost and power consumption. This also eliminates the flexibility of applying different authentication and decryption algorithms to increase the security level for different AI models.

On the other hand, FPGA offers a viable platform with programmable hardware acceleration for AI inference applications. In terms of security advantage, FPGA has advantage with its proprietary implementation that ensures the code or custom logic is not exposed to end customer. FPGA also provides hardware-level encryption which protects against physical attacks such as tampering and others. Besides, with the advantage of reconfigurable and programmable hardware, a flexible authentication and decryption algorithm can be implemented, which will allow users to deploy different authentication and decryption algorithms for different AI models. This ensures that when any vulnerability is found, the hardware can be re-programmed and re-deployed at a lower cost.

However, existing FPGA-based AI solutions are mostly implemented based on custom AI accelerator IP core, where only certain network topologies are supported. In the case if a targeted AI model contains a layer or operation that is not supported by the IP core, such model cannot be deployed until the IP core is updated with added support, which may involve long design cycle and causes immerse impact on time-to-market. This poses a significant drawback as AI research is fast growing, where new model topologies or layers with better accuracy and efficiency are invented at a rapid rate. A flexible and robust AI inference can be achieved by utilizing an embedded processor that supports custom instruction extension on FPGA.

In general, an instruction set architecture (ISA) defines the supported instructions by a processor. There are ISAs for certain processor variants that include custom instruction support, where specific instruction opcodes are reserved for custom instruction implementations. This allows developers or users to implement their own customized instruction based on targeted applications. Differing from ASIC chip where the implemented custom instruction(s) are to be fixed at development time, with FPGA the custom instruction implementation is configurable or programmable by users for different applications using the same FPGA chip.

With the use of embedded processor that supports custom instruction extension connected to custom instruction hardware on FPGA, a flexible and robust authentication and decryption flow can be implemented. By applying the methodology, a more secured environment is infused; whereby only encrypted AI model is stored in flash memory and can only be run on trusted processor having a custom instruction connected to custom hardware in order to run the AI inference.

Ling Weiwei et al, CN114428761A, disclosed a device comprising of a display module, a control key module, an audio decoding module and an FPGA module with a neural network hardware accelerator soft core, the FPGA module is used for realizing control of each module and artificial intelligence data operation, the FPGA module carries an on-chip system, and the on-chip system is connected with the audio decoding module.

Hence, it would be advantageous to alleviate the shortcomings by having a method of securing AI model based on FPGA, whereby said method utilizes embedded processor within said FPGA with custom instruction extension and programmable custom instruction hardware developed on said FPGA to perform authentication and decryption on encrypted AI model.

3. SUMMARY OF THE INVENTION

Accordingly, it is the primary aim of the present invention to provide a method of securing AI model using FPGA which provides flexibility on the implementation of authentication and decryption algorithms.

It is yet another objective of the present invention to provide a method of securing AI model using FPGA which overcomes attacks against AI model by protecting the architecture of said AI model.

Additional objects of the invention will become apparent with an understanding of the following detailed description of the invention or upon employment of the invention in actual practice.

According to the preferred embodiment of the present invention the following is provided:

A method of securing artificial intelligence (AI) model, comprising the following steps:
  i. performing encryption on at least one AI model from any suitable external device, generating at least one encrypted AI model and at least one encryption key; before wrapping said encryption key with at least one authentication key through at least one key wrapping algorithm from any suitable external device;
  ii. storing said encrypted AI model in any suitable device memory while embedding said wrapped encryption key in at least one custom instruction hardware;
  iii. running a secured boot-up sequence by at least one processor;
  iv. authenticating at least one authentication key given by user using at least one authentication algorithm in said processor;
  v. unwrapping the wrapped encryption key using authentication key before decrypting said encrypted AI model using at least one decryption module and said encryption key, in said custom instruction hardware;
  vi. executing at least one application using said unencrypted AI model.

In another embodiment of the invention there is provided:

A method of securing artificial intelligence (AI) model (101), comprising the following steps:
  i. performing encryption on at least one AI model from any suitable external device, generating at least one encrypted AI model and at least one encryption key;
  ii. storing said encrypted AI model in any suitable device memory while embedding said encryption key in at least one custom instruction hardware;
  iii. running a secured boot-up sequence by at least one processor;
  iv. authenticating at least one authentication key given by user using at least one authentication algorithm in said processor;
  v. decrypting said encrypted AI model using at least one decryption module and said encryption key, in said custom instruction hardware;
  vi. executing at least one application using said unencrypted AI model.

In another embodiment of the invention there is provided:
A system of securing artificial intelligence (AI) model, comprising of
  at least one processor;
  at least one custom instruction hardware developed on at least one field programmable gate array (FPGA);
  wherein said processor and custom instruction hardware are connected via custom instruction interfaces;
  wherein said processor is configured to perform matching of an authentication key given by a user with the authentication key available in said custom instruction hardware;
  wherein said custom instruction hardware is configured to decrypted said AI model and send said decrypted AI model to said processor for said AI model to be executed in any suitable application.

4. BRIEF DESCRIPTION OF THE DRAWINGS

Other aspect of the present invention and their advantages will be discerned after studying the Detailed Description in conjunction with the accompanying drawings in which:

FIG. 1A is a flowchart showing the method of securing AI model of the present invention, in an embodiment whereby the encryption key is wrapped with authentication key while

5. DETAILED DESCRIPTION OF THE DRAWINGS

In the following detailed description, numerous specific details are set forth in order to provide a thorough understanding of the invention. However, it will be understood by the person having ordinary skill in the art that the invention may be practised without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

This invention presents a methodology of securing AI model based on FPGA. The proposed approach utilizes processor 401 (external processor or softcore processor embedded in said FPGA) with custom instruction extension and programmable custom instruction hardware 403 developed on said FPGA to perform authentication and decryption on encrypted AI model. The proposed work ensures that the code can only be run on trusted devices which is not achievable with mobile GPU and MCU.

Figure 1A:
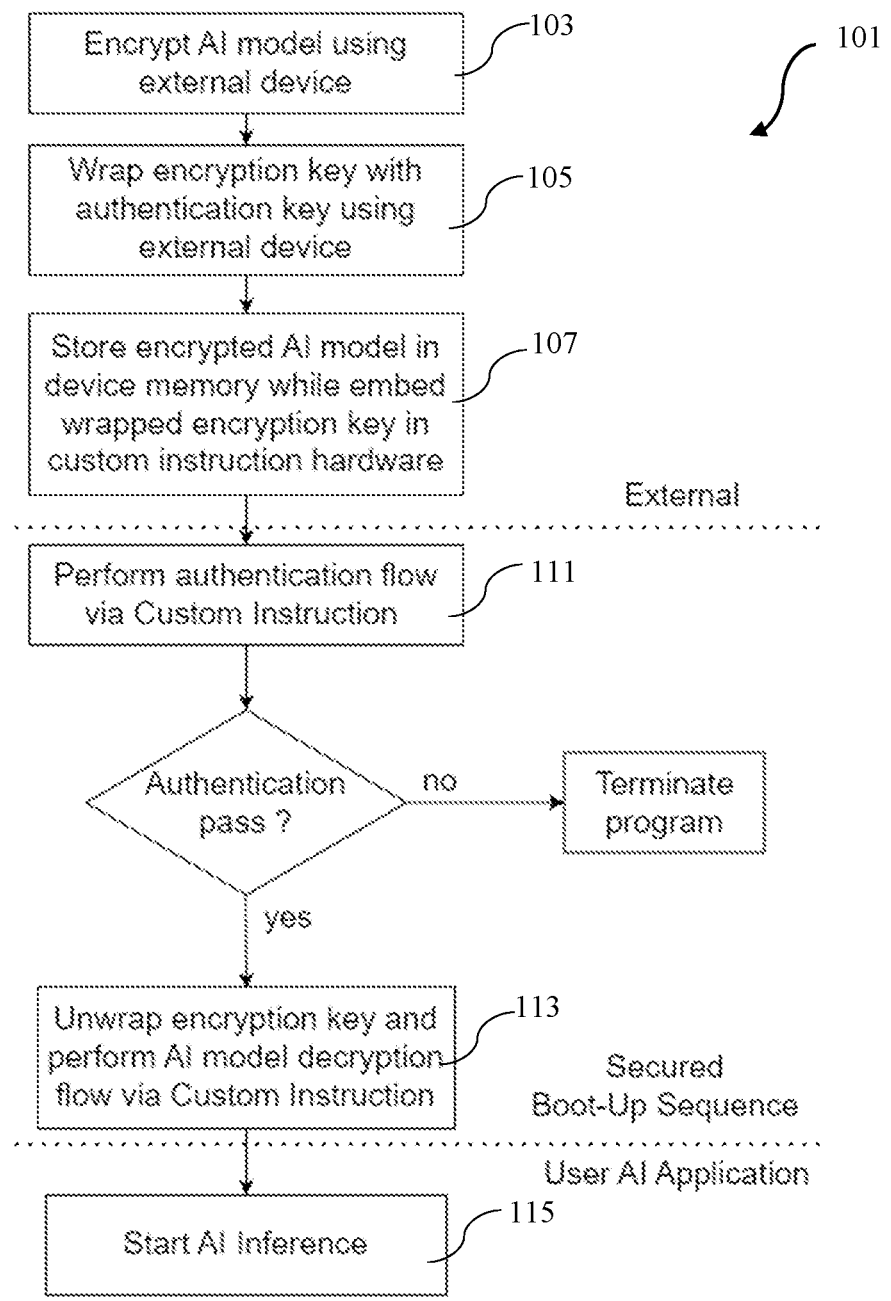

FIG. 1A illustrates the proposed methodology 101 and design flow of securing AI model based on FPGA of the present invention, in an embodiment whereby the encryption key is wrapped with authentication key. To get started, in step (i), encryption is performed 103 on at least one AI model from any suitable external device with a predetermined encryption scheme. External device is a device outside of the FPGA, which has the capability to encrypt the AI model. Some of the examples include using a python script to perform encryption on local CPU/desktop. After the AI model is encrypted, an encrypted AI model and its corresponding encryption key are generated. The encryption key can be symmetric or asymmetric. The encryption key is then wrapped 105 with at least one authentication key through at least one key wrapping algorithm from any suitable external device. In step (ii), the wrapped encryption key is embedded in at least one custom instruction hardware 403 while the encrypted AI model is stored 107 in any suitable device memory. The action of storing said encrypted AI model and embedding said encryption key can be done simultaneously or sequentially at any suitable sequence. This means that the embedding of encryption key can be done at the same time, before or after storing said encrypted AI model.

In step (iii), at least one processor 401 runs on a secured boot-up sequence, wherein said processor's security flow is compiled as at least one object under a static library for code protection, while the custom instruction hardware 403 is encrypted using any one suitable encryption tool such as FPGA encryption. This adds another layer of security that preserves the code itself in said custom instruction hardware 403 which can cause security flaws if exposed to outsiders as well as protects the encryption key that is stored on said custom instruction hardware 403. After the processor 401 powers-up, a security process is implemented; whereby the authentication and decryption are performed, as shown in steps (iv) and (v) to obtain a decrypted AI model which will be used for AI inference as said runtime application.

In step (iv), at least one authentication key given by user is authenticated 111 using at least one any suitable authentication algorithm in said processor 401. The authentication algorithm runs via custom instructions between said processor 401 and said custom instruction hardware 403. The processor 401 sends custom instructions to said custom instruction hardware 403 to retrieve said authentication key preloaded in said custom instruction hardware 403. The processor 401 authenticates the authentication key that is derived from said custom instruction hardware 403 to ensure that said application is running on trusted devices and matches with preloaded partial authentication key or derived authentication key on said processor 401. If said authentication key's authentication fails, the application will not be executed. If said authentication key's authentication is successful, said authentication key will be used to unwrap said wrapped encryption key stored in said custom instruction hardware 403 on decryption module 507 which will be used for decryption process. Examples of types of authentications algorithm that can be used are simple bare key authentication, Diffie-Hellman algorithm and other suitable authentication algorithms.

In step (v), since the encryption key was previously wrapped with said authentication key, the processor 401 also sends custom instructions that contain authentication key to said custom instruction hardware 403 whereby said custom instruction hardware 403 unwraps the wrapped encryption key using said authentication key through at least one key wrapping algorithm, before said custom instruction hardware decrypts said encrypted AI model data. After unwrapping said encryption key, said AI model is decrypted 113 by a decryption module. The processor 401 sends custom instructions that contain said encrypted AI model data to said custom instruction hardware 403, whereby said custom instruction hardware 403 decrypts said encrypted AI model data, which will generate the unencrypted AI model data. A decryption module 507 which is compatible with said predetermined encryption scheme should be chosen, and said decryption module 507 needs to be coded on said one custom instruction hardware 403. In step (vi), said unencrypted AI model is then used to execute 115 applications such as AI inference.

Figure 1B:
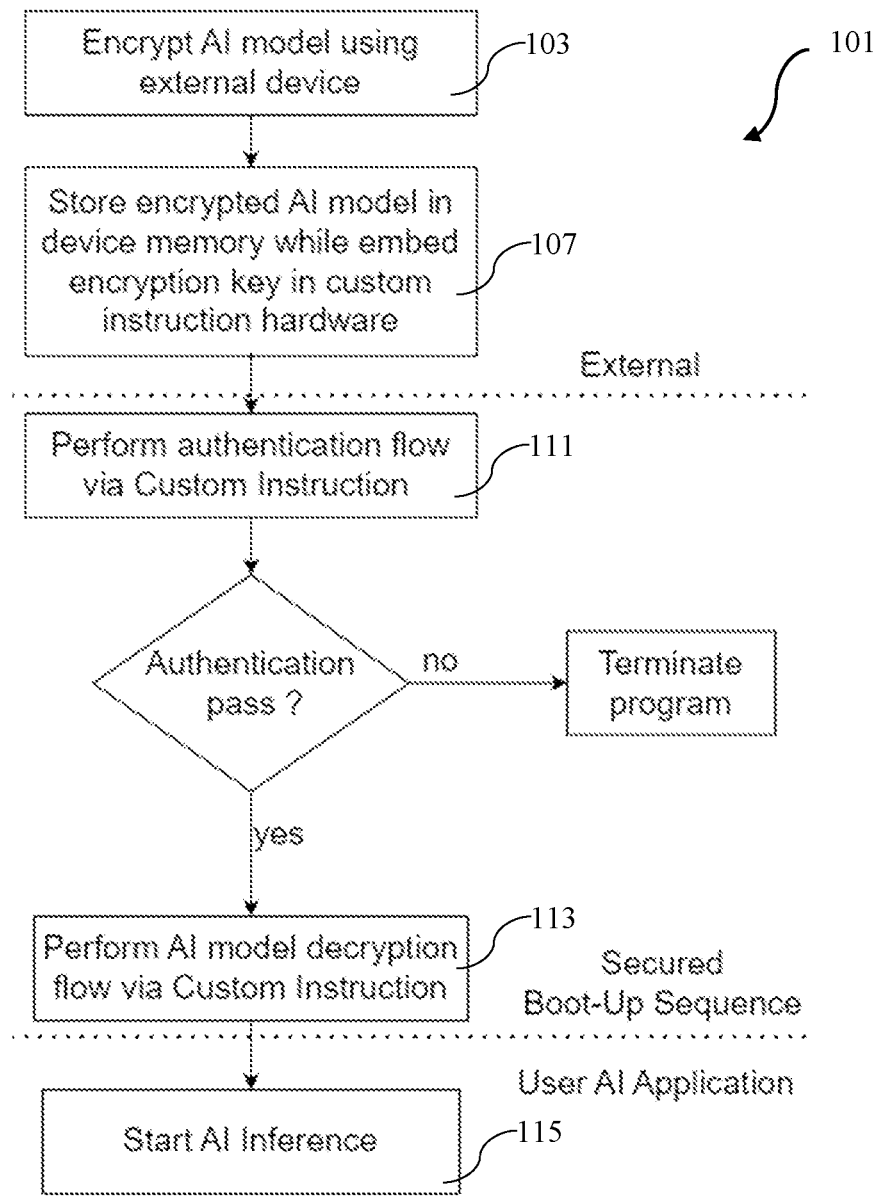
FIG. 1B is a flowchart showing the method of securing AI model of the present invention, in an embodiment whereby the encryption key is not wrapped with authentication key.

FIG. 1B illustrates the proposed methodology 101 and design flow of securing AI model based on FPGA of the present invention, in the embodiment whereby the encryption key is not wrapped with authentication key, which has less security level but is still possible to be implemented. To get started, in step (i), encryption is performed 103 on at least one AI model from any suitable external device with a predetermined encryption scheme. External device is a device outside of the FPGA, which has the capability to encrypt the AI model. Some of the examples include using a python script to perform encryption on local CPU/desktop. After the AI model is encrypted, an encrypted AI model and its corresponding encryption key are generated. The encryption key can be symmetric or asymmetric. In step (ii), the encryption key is embedded in at least one custom instruction hardware 403 while the encrypted AI model is stored 107 in any suitable device memory. The action of storing said encrypted AI model and embedding said encryption key can be done simultaneously or sequentially at any suitable sequence. This means that the embedding of encryption key can be done at the same time, before or after storing said encrypted AI model.

In step (iii), at least one processor 401 runs on a secured boot-up sequence, wherein said processor's security flow is compiled as at least one object under a static library for code protection, while the custom instruction hardware 403 is encrypted using any one suitable encryption tool such as FPGA encryption. This adds another layer of security that preserves the code itself in said custom instruction hardware 403 which can cause security flaws if exposed to outsiders as well as protects the encryption key that is stored on said custom instruction hardware 403. After the processor 401 powers-up, a security process is implemented; whereby the authentication and decryption are performed, as shown in steps (iv) and (v) to obtain a decrypted AI model which will be used for AI inference as said runtime application.

In step (iv), at least one authentication key given by user is authenticated 111 using at least one any suitable authentication algorithm in said processor 401. The authentication algorithm runs via custom instructions between said processor 401 and said custom instruction hardware 403. The processor 401 sends custom instructions to said custom instruction hardware 403 to retrieve said authentication key preloaded in said custom instruction hardware 403. The processor 401 authenticates the authentication key that is derived from said custom instruction hardware 403 to ensure that said application is running on trusted devices and matches with preloaded partial authentication key or derived authentication key on said processor 401. If said authentication key's authentication fails, the application will not be executed. If said authentication key's authentication is successful, shall proceed to the next step. Examples of types of authentications algorithm that can be used are simple bare key authentication, Diffie-Hellman algorithm and other suitable authentication algorithms.

In step (v), said custom instruction hardware decrypts said encrypted AI model data. The AI model is decrypted 113 by a decryption module. The processor 401 sends custom instructions that contain said encrypted AI model data to said custom instruction hardware 403, whereby said custom instruction hardware 403 decrypts said encrypted AI model data, which will generate the unencrypted AI model data. A decryption module 507 which is compatible with said predetermined encryption scheme should be chosen, and said decryption module 507 needs to be coded on said one custom instruction hardware 403. In step (vi), said unencrypted AI model is then used to execute 115 applications such as AI inference.

Figure 2:
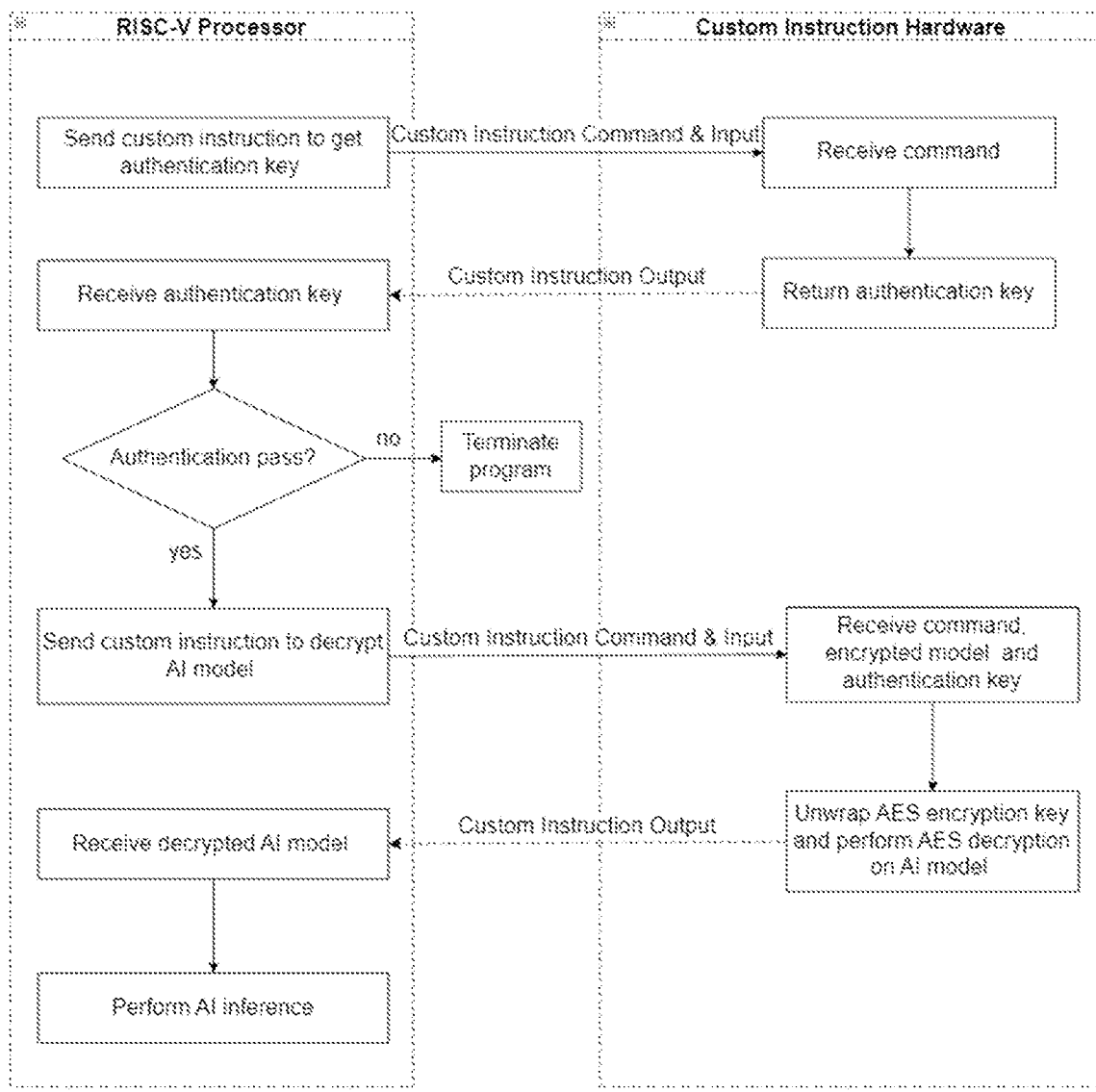
FIG. 2 is a flowchart showing an example of the proposed methodology and design flow of securing AI model based on FPGA of the present invention, using simple key authentication algorithm; advanced encryption standard (AES) key wrap algorithm and AES encryption-decryption scheme.

FIG. 2 shows an example of the proposed methodology and design flow of securing AI model based on FPGA of the present invention, utilizing a programmed bitstream of reduced instruction set computer V (RISC-V) softcore processor with custom instruction hardware design by using simple key authentication algorithm; advanced encryption standard (AES) key wrap algorithm and AES encryption-decryption scheme. An AI model is encrypted using AES encryption from any suitable external device. The encrypted AI model is then stored in a device memory. The AES encryption key is wrapped with complete authentication key using AES key wrap algorithm and will be embed on a custom instruction hardware 403. The complete authentication key is embedded on said custom instruction hardware 403 and a partial authentication key (which is the first part of the complete authentication key) is provided by a user and is stored in a device memory for said processor to perform authentication.

After the bitstream of RISC-V softcore processor is loaded into the FPGA and before the processor executes the application, the security process is implemented, as shown in FIG. 2. The authentication flow starts, whereby the processor sends custom instructions to retrieve the complete authentication key from said custom instruction hardware 403. The processor then uses the partial authentication key stored in said device memory, to authenticate against the complete authentication key and ensure that the partial authentication key matches the first part of the complete authentication key. If said portion of complete authentication key and partial authentication key do not match, then the authentication fails, and the application will not be executed. If said portion of complete authentication key and partial authentication key matches, then the authentication passes.

The process continues with the decryption flow; whereby the processor sends the encrypted AI model, together with said complete authentication key to said custom instruction hardware 403 to unwrap AES encryption key and perform AES decryption. The processor will receive the unencrypted AI model, which will be used to run AI inference.

Figure 3:
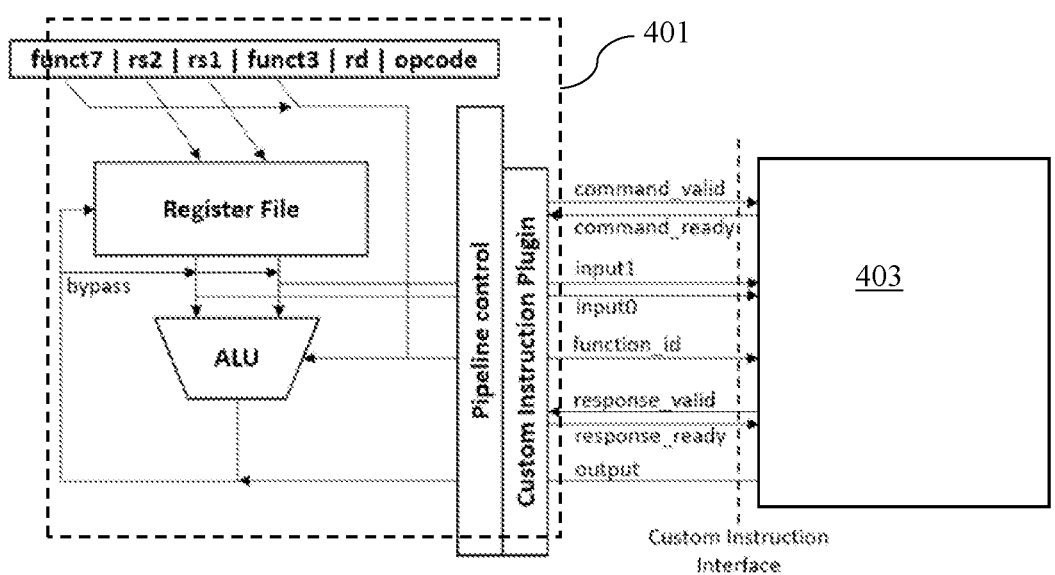
FIG. 3 is a block diagram showing the system of securing AI model of the present invention.

The invention also presents a system of securing AI model based on FPGA. FIG. 3 illustrates a block diagram of a processor 401 within an FPGA with custom instruction support or plugin connected to a programmable custom instruction hardware 403 developed on said FPGA to perform authentication and decryption on encrypted AI model. As shown in FIG. 3, an example of custom instruction interface comprises of command group and response group. The command group comprises of command_valid interface and command_ready interface that are used to indicate the validity of input0 interface, input1 interface, and function_id interface. Generally, the input0 interface, input1 interface, and function_id interface is valid if command_valid signal from said custom instruction hardware 403 and command_ready signal from said processor 401 are both high, indicating a handshake. The response group comprises of response_valid interface and response_ready interface that are used to indicate the validity of the output interface. With single custom instruction opcode and M-bit function_id, a total of $2^M$ custom instructions can be implemented. This allows more custom instructions set to be used for multiple purposes such as layer speedup, operation speedup and others.

Figure 4:
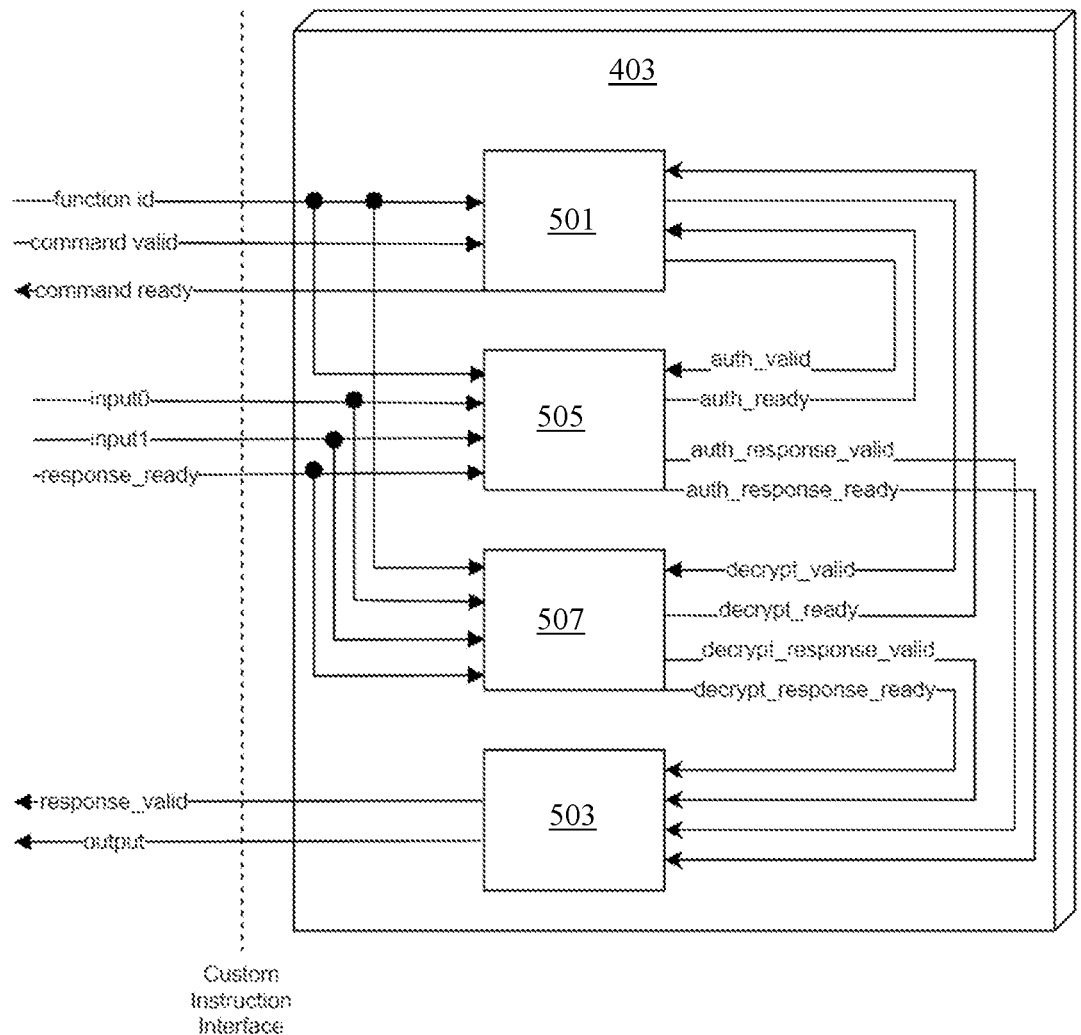
FIG. 4 is a block diagram showing the components of the custom instruction hardware.

FIG. 4 shows the architecture of programmable custom instruction hardware 403. The command control block 501 is used for sharing of the command_ready signal and command_valid signal among different modules in said programmable custom instruction hardware 403 by using the function_id to select which module in said programmable custom instruction hardware 403 to receive said command_ready signal and command_valid signal. The response control block 503 is used for multiplexing the response_valid signal and output signal from the modules in said programmable custom instruction hardware 403 to the custom instruction interfaces response_valid interface and output interface.

The custom instruction hardware 403 comprises of two main modules: authentication module 505 and decryption module 507. The authentication module 505 implements the authentication flow with the processor 401 via the custom instructions, which in the end will generate a final authentication key that will be used by said processor 401 for authentication purposes through the output interface. The decryption module 507 in said custom instruction hardware 403 performs unwrapping of encryption key using the authentication key through said key wrapping algorithm and decrypting said encrypted AI model based on the user selected encryption scheme with said processor 401 via the custom instructions and returns the original and unencrypted AI model to said processor 401 through the output interface for AI inference purposes.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

What is claimed is:

1. A method of securing an artificial intelligence (AI) model, comprising:
   i. performing encryption on at least one AI model using an external device, thereby generating at least one encrypted AI model and at least one encryption key;
   ii. storing the at least one encrypted AI model in a device memory while embedding the at least one encryption key in at least one custom instruction hardware;
   iii. running a secured boot-up sequence by at least one processor;
   iv. authenticating at least one authentication key given by a user using at least one authentication algorithm in the at least one processor, wherein the at least one authentication key is generated or stored by at least one authentication module within the at least one custom instruction hardware before sending the at least one authentication key to the at least one processor via custom instructions;
   v. decrypting the at least one encrypted AI model using at least one decryption module and the at least one encryption key in the at least one custom instruction hardware so as to obtain an unencrypted AI model; and vi. executing at least one application using the unencrypted AI model, wherein the at least one processor comprises a custom instruction extension configured to be connected to the at least one custom instruction hardware via custom instruction interfaces.

2. The method of securing the artificial intelligence (AI) model as claimed in claim 1, further comprising:
wrapping the at least one encryption key with the at least one authentication key after performing encryption in I so as obtain at least one wrapped encryption key; and
unwrapping the at least one wrapped encryption key using the at least one authentication key before performing the decrypting in v.

3. The method of securing the artificial intelligence (AI) model as claimed in claim 1, wherein the storing the at least one encrypted AI model and embedding the at least one encryption key can be done simultaneously or sequentially in a sequence.

4. The method of securing the artificial intelligence (AI) model as claimed in claim 1, further comprising compiling the at least one application as at least one object under a static library while the at least one custom instruction hardware is encrypted using a custom designed encryption tool.

5. The method of securing the artificial intelligence (AI) model as claimed in claim 1, wherein the at least one encryption key is symmetric or asymmetric.

6. The method of securing the artificial intelligence (AI) model as claimed in claim 2, wherein the at least one encryption key is wrapped through at least one key wrapping algorithm from the external device.

7. The method of securing the artificial intelligence (AI) model as claimed in claim 1, wherein the at least one processor is an external processor or softcore processor embedded in a field programmable gate array (FPGA).

8. The method of securing the artificial intelligence (AI) model as claimed in claim 1, wherein the device memory is a serial peripheral interface (SPI) flash memory.

9. The method of securing the artificial intelligence (AI) model as claimed in claim 2, wherein the at least one authentication algorithm is a simple bare key authentication, or a Diffie-Hellman algorithm.

10. The method of securing the artificial intelligence (AI) model as claimed in claim 2, wherein unwrapping of the at least one wrapped encryption key is done through at least one key wrapping algorithm.

11. The method of securing the artificial intelligence (AI) model as claimed in claim 1, wherein the encryption and decryption is done using an advanced encryption standard (AES).

12. The method of securing the artificial intelligence (AI) model as claimed in claim 2, further comprising compiling the at least one application as at least one object under a static library while the at least one custom instruction hardware is encrypted using a custom designed encryption tool.

13. The method of securing the artificial intelligence (AI) model as claimed in claim 2, wherein the at least one encryption key is symmetric or asymmetric.

14. The method of the securing artificial intelligence (AI) model as claimed in claim 2, wherein the at least one processor is an external processor or a softcore processor embedded in a field programmable gate array (FPGA).

15. The method of securing the artificial intelligence (AI) model as claimed in claim 2, wherein the device memory is a serial peripheral interface (SPI) flash memory; or the encryption and decryption is done using an advanced encryption standard (AES).

16. The method of securing the artificial intelligence (AI) model as claimed in claim 1,
wherein the custom instruction interfaces comprise a command group custom instruction interface and a response group custom instruction interface;
wherein the command group custom instruction interface comprises a command_valid interface and a command_ready interface that are used to indicate a validity of an input0 interface, an input1 interface, and a function_id interface; and
wherein the response group custom instruction interface comprises a response_valid interface and a response_ready interface that are used to indicate a validity of an output interface.

17. A system of securing an artificial intelligence (AI) model, comprising:
at least one processor comprising a custom instruction extension; and
at least one custom instruction hardware developed on at least one field programmable gate array (FPGA);
wherein the at least one processor and the at least one custom instruction hardware are connected via custom instruction interfaces;
wherein the at least one processor is configured to perform matching of an authentication key given by a user with an authentication key available in the at least one custom instruction hardware;
wherein the at least one custom instruction hardware is configured to decrypt the AI model and send the decrypted AI model to the at least one processor for the AI model to be executed in an application;
wherein the at least one custom instruction hardware comprises:
a command control block for sharing of a command_ready signal and a command_valid signal among different modules in the at least one custom instruction hardware by using a function_id to select which module in the at least one custom instruction hardware to receive the command_ready signal and the command_valid signal;
a response control block for multiplexing a response_valid signal and an output signal from one or more modules in the at least one custom instruction hardware to the custom instruction interfaces, a response_valid interface and an output interface;
an authentication module that implements an authentication flow with the at least one processor via custom instructions of the custom instruction interfaces, which generates a final authentication for use by the at least one processor in authentication; and
a decryption module configured to decrypt the AI model according to a user-selected encryption scheme via the custom instructions from the at least one processor, thereby generating the original and unencrypted AI model, and output the original and unencrypted AI model to the at least one processor for AI inference.

18. The system of securing the artificial intelligence (AI) model as claimed in claim 17, wherein the custom instruction interfaces comprise a command group custom instruction interface and a response group custom instruction interface.

19. The system of securing the artificial intelligence (AI) model as claimed in claim 18, wherein the command group custom instruction interface comprises a command_valid interface and a command_ready interface that are used to indicate a validity of an input0 interface, an input1 interface, and a function_id interface.

20. The system of securing the artificial intelligence (AI) model as claimed in claim 18, wherein the response group custom instruction interface comprises the response_valid interface and a response_ready interface that are used to indicate a validity of the output interface.

* * * * *